United States Patent
DeWaart

(12) 
(10) Patent No.: US 6,355,155 B1
(45) Date of Patent: Mar. 12, 2002

(54) METHOD AND A DEVICE FOR RECOVERING METALS COMPRISING DISSOLVING, CONCENTRATING AND ELECTROWINNING MEANS WITH ROTATABLE CATHODE

(75) Inventor: Michael Wilhelmus Hendrikus Maria DeWaart, Amsteldijk Noord (NL)

(73) Assignee: Rafel Beheer B.V. (NL)

( * ) Notice: Subject to any disclaimer, the term of this patent is extended or adjusted under 35 U.S.C. 154(b) by 0 days.

(21) Appl. No.: 09/445,856
(22) PCT Filed: Jun. 17, 1998
(86) PCT No.: PCT/NL98/00349
  § 371 Date: Mar. 27, 2000
  § 102(e) Date: Mar. 27, 2000
(87) PCT Pub. No.: WO98/58090
  PCT Pub. Date: Dec. 23, 1998

(30) Foreign Application Priority Data
  Jun. 17, 1997 (NL) .............................................. 1006340

(51) Int. Cl.$^7$ ................................................. C25C 7/00
(52) U.S. Cl. ........................ 205/560; 205/767; 204/212; 204/242
(58) Field of Search ................................. 205/560, 767; 204/212, 242

(56) References Cited

U.S. PATENT DOCUMENTS 4,544,460 A * 10/1985 Ochs .......................... 204/107

* cited by examiner

*Primary Examiner*—Arun S. Phasge
(74) *Attorney, Agent, or Firm*—Moser, Patterson & Sheridan, L.L.P.

(57) ABSTRACT

A method and a device for recovering metals from a metal-containing flow, wherein: a) the metal-containing flow (7) and a solvent (8) are supplied to a dissolving unit (1), whereby a metal-containing solution is formed; b) the metal-containing solution is then supplied to a concentration unit (2); c) the metal-containing solution is separated in the concentration unit into a small-volume flow (14) containing a high concentration of metal salts and/or metal hydroxides, and a large-volume flow (13) containing a low concentration of metal salts and/or metal hydroxides; d) the small-volume flow (14) containing a high concentration of metal salts and/or metal hydroxides is supplied to an electrochemical unit (5); and e) the small-volume flow containing a high concentration of metal salts and/or metal hydroxides is separated in said electrochemical unit into a flow (16) containing one or more metals, and a flow (15) containing a low concentration of metal salts and/or metal hydroxides.

22 Claims, 3 Drawing Sheets

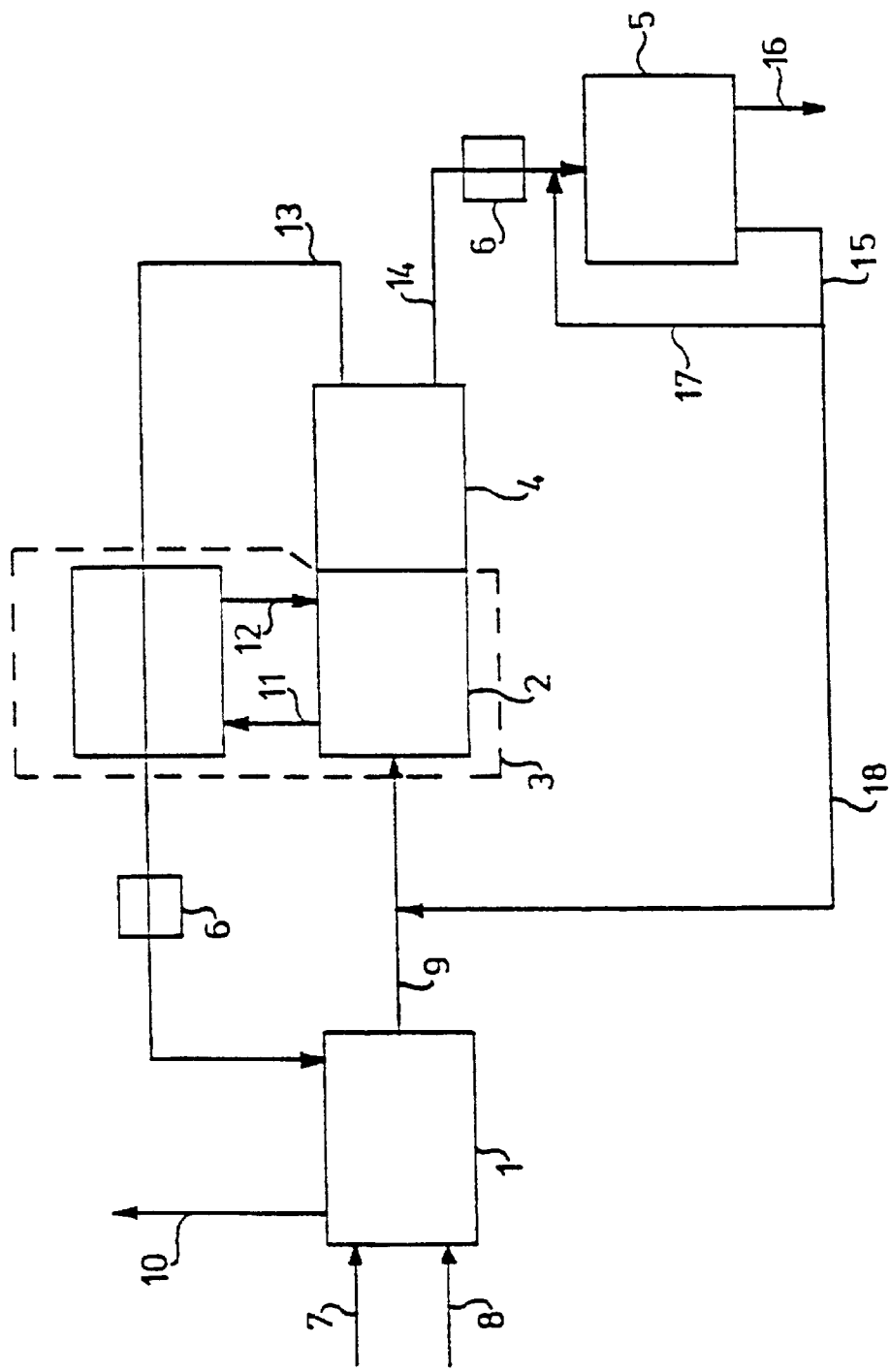

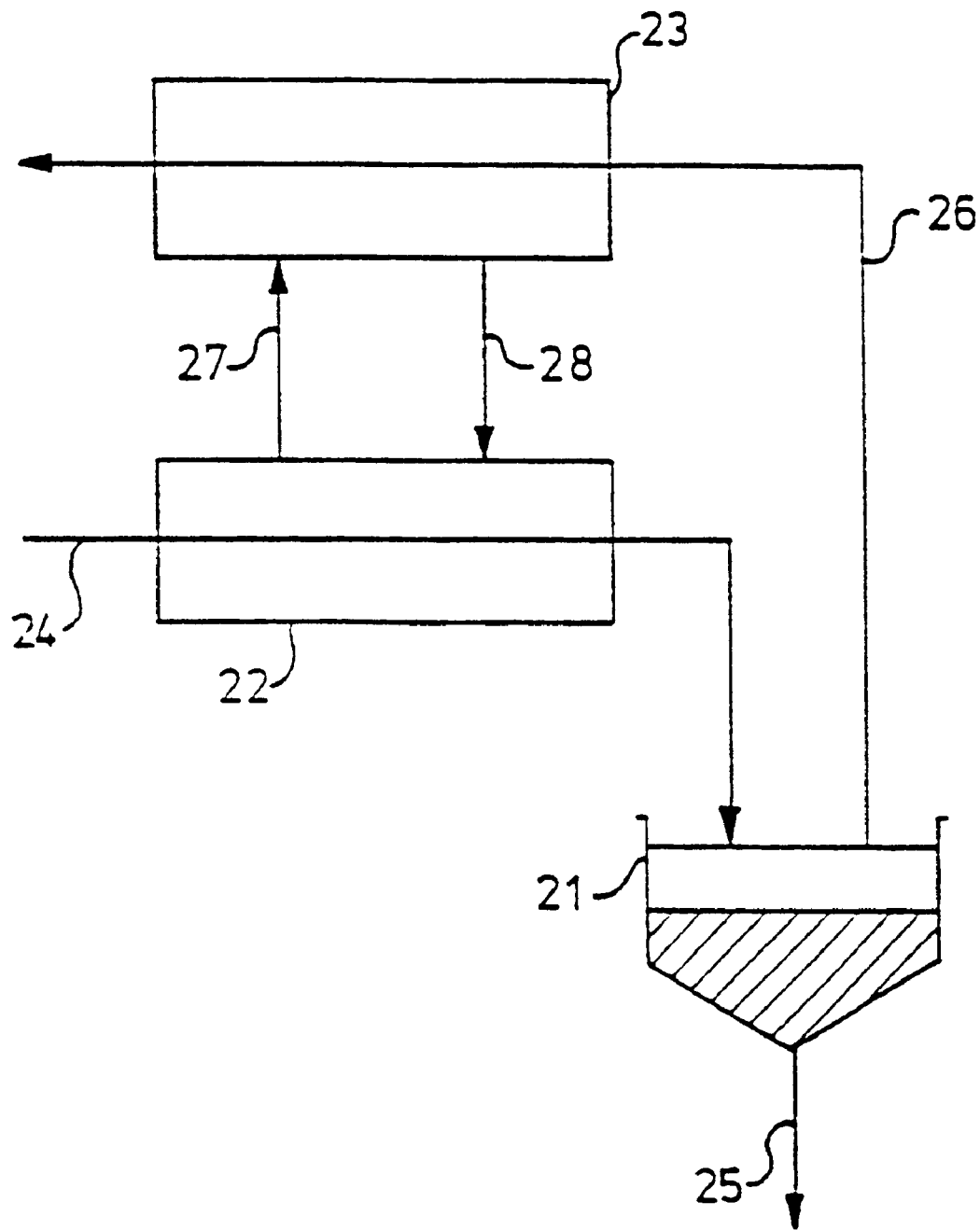

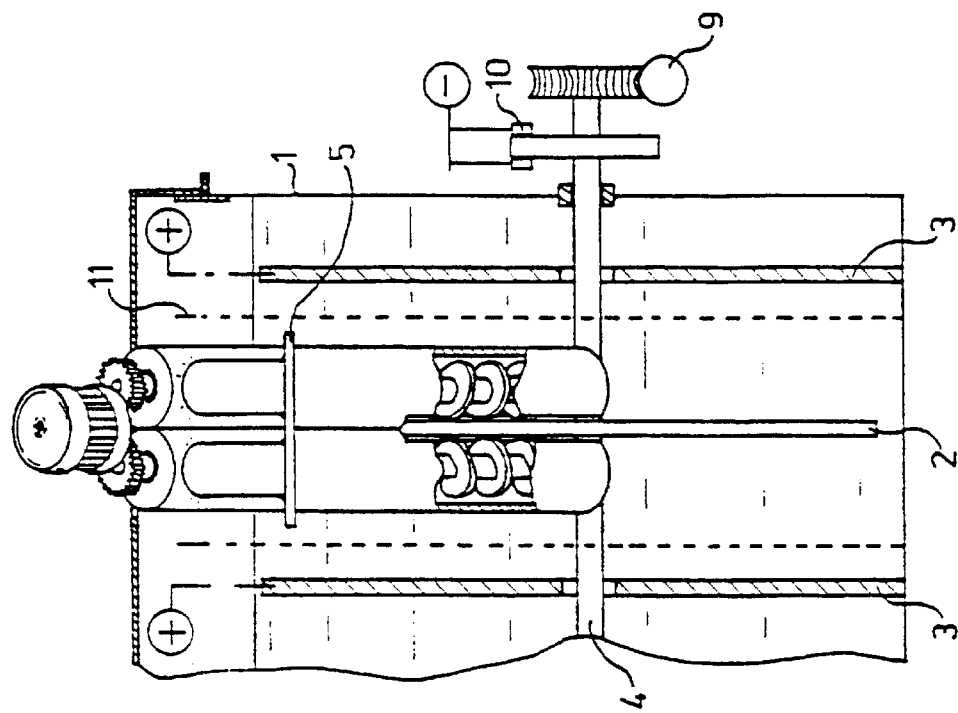
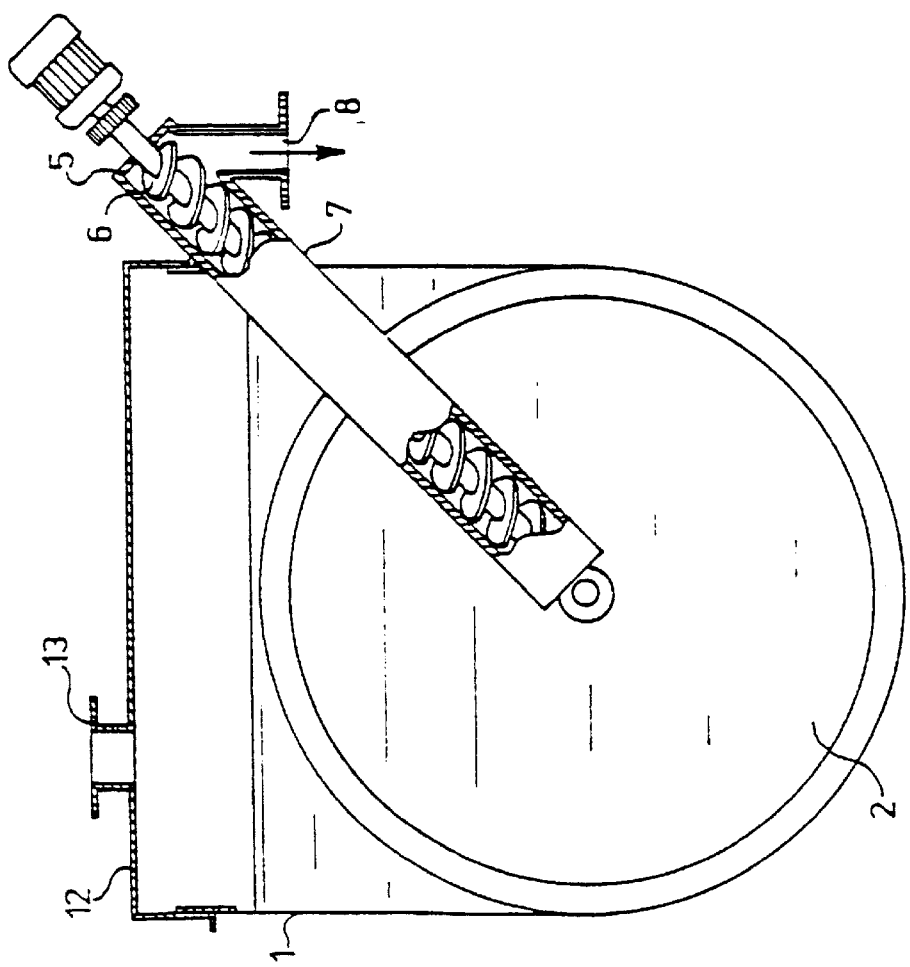

METHOD AND A DEVICE FOR RECOVERING METALS COMPRISING DISSOLVING, CONCENTRATING AND ELECTROWINNING MEANS WITH ROTATABLE CATHODE

This application is a 371 of PCT/NL98/00349 filed Jun. 17, 1998.

The invention relates to a method and a device for recovering metals from a metal-containing flow, for example from ores, metal-containing residues and waste materials.

With known methods and devices for recovering metals from metal-containing flows, a great of energy is consumed. Said metal-containing flows may be flows of solid materials, for example ores, or of liquid materials, for example metal-containing slurries or solutions. Since the energy is usually generated by the combustion of fossil fuels, large amounts of gases, such as carbon dioxide, are emitted. The emission of such "greenhouse" gases affects the environment. Moreover, due to the large energy consumption, such methods and devices are not very efficient.

The invention provides a solution for the above problem. Accordingly, the invention relates to a method as referred to in the introduction, wherein:

a. the metal-containing flow and a solvent are supplied to a dissolving unit, whereby a metal-containing solution is formed;

b. the metal-containing solution is then supplied to a concentration unit;

c. the metal-containing solution is separated in the concentration unit into a small-volume flow containing a high concentration of metal salts and/or metal hydroxides, and a large-volume flow containing a low concentration of metal salts and/or metal hydroxides;

d. the small-volume flow containing a high concentration of metal salts and/or metal hydroxides is supplied to an electrochemical unit; and e. the small-volume flow containing a high concentration of metal salts and/or metal hydroxides is separated in said electrochemical unit into a flow containing one or more metals, and a flow containing a low concentration of metal salts and/or metal hydroxides.

The term metal salts and/or metal hydroxides is understood to include inorganic and metallo-organic compounds containing metal cations, wherein said compounds may be single salts (for example nickel (II) chloride) or complex salts (that is, salts which contain the same metals exhibiting different stages of oxidation, or different metals, which may or may not exhibit the same stage of oxidation, or single hydroxides (for example tin hydroxide) or complex hydroxides (for example borates), and wherein one or more ligands, for example ammonia, may bonded to the metal cations.

The advantages of the invention are that the method requires much less energy than usual, that the method proceeds quickly and that it is possible to use devices of much smaller dimensions than those which are used with methods according to the prior art. These advantages are achieved in particular because separate circuits are used for the dissolving method and for the electrochemical method. Furthermore it is possible to carry out parts of the methods or the entire method as such for recovering all types of metals, in particular the metals copper, lead, tin, zinc, antimony, chromium, gold, cadmium, silver and nickel, and alloys such as brass. Furthermore it is possible to adapt method parameters such as the flow rate, the temperature and the like to the demand and to the chemical and/or physical requirements which are made of the raw material and of the final product.

In the dissolving unit, a metal-containing flow, for example scrap, sludge and/or ash, is mixed with one or more solvents, for example water. The solvents may contain additives, which promote the dissolution of the metals. Examples of such additives are acids and bases. When the metals are being dissolved, a solution of metal salts and/or metal hydroxides is formed, as well as a vapour and gas flow, which substantially contains solvent in the vapour phase, for example water vapour, and reaction gases, for example hydrogen, carbon dioxide, ammonia, oxygen, nitrogen and nitrogen oxides.

The separation of the solution in the concentration unit preferably takes place by cooling down the solution, whereby a heat-containing flow and a cooled-down solution are formed. Part of the heat which is contained in the original solution is transferred to the heat-containing flow as a result of the evaporation of volatile components which are present in the solution, so that the original solution is cooled down. The heat is preferably transferred as a result of the evaporation of the solvent or the solvents, for example water or a mixture of water and one or more other solvents, from the solution. Accordingly, the heat-containing flow substantially consists of a vapour-phase solvent or solvents from the solution, and in particular substantially of water vapour.

The heat-containing flow is preferably led to a heat exchange plant, so that the heat of the heat-containing flow can be transferred to another process flow, which is to be heated. Consequently, the heat is largely withdrawn from the heat-containing flow, so that the vapour-phase solvent or solvents will condense and a relatively cold flow consisting of a solvent or solvents is formed. Said relatively cold flow consisting of a solvent or solvents can then be led back to the concentration unit.

When the solution is cooled down to a temperature below the saturation temperature, metal salts and/or metal hydroxides will separate from the solution, for example by precipitating or crystallizing. According to the invention the cooled-down solution is thus carried to a settling unit, where the cooled-down solution is separated into a small-volume flow containing a high concentration of metal salts and/or metal hydroxides, and a large-volume flow containing a low concentration of metal salts and/or metal hydroxides.

The large-volume flow, which contains a low concentration of metal salts and/or metal hydroxides, can be led back again, for example to the dissolving unit or to the concentration unit. According to the invention, this large-volume flow, which contains a low concentration of metal salts and/or metal hydroxides, is preferably led back to the dissolving unit.

The large-volume flow containing the low concentration of metal salts and/or metal hydroxides is preferably heated before being led back to the dissolving unit or to the concentration unit. Preferably, the heat which can be transferred via the heat-containing flow and the heat exchange plant is used for heating said large-volume flow. A major advantage of this embodiment is the fact that the energy requirement of this method is much lower than that of comparable, conventional methods.

The small-volume flow containing a high concentration of metal salts and/or metal hydroxides is fed to an electrochemical unit. The small-volume flow containing a high concentration of metal salts and/or metal hydroxides is preferably heated before being led to the electrochemical unit, whereby the required heat may be withdrawn from the heat-containing flow. The required heat may also be provided by using a heat source.

In the electrochemical unit, the small-volume flow containing a high concentration of metal salts and/or metal hydroxides is separated into a flow containing one or more metals and a flow containing a low concentration of metal salts and/or metal hydroxides.

It is preferred to lead back part of the flow containing a low concentration of metal salts and/or metal hydroxides to the concentration unit, whilst another part is led back to the electrochemical unit. More in particular, only a small part of the flow is led back to the concentration unit, whilst the larger part of said flow is led back to the electrochemical unit. According to the invention, it is generally not necessary to heat the flow containing a low concentration of metal salts and/or metal hydroxides that is led back to the electrochemical unit. If it should be necessary to heat said flow, however, this will be possible, of course, for example by mixing said flow with the small-volume flow containing a high concentration of metal salts and/or metal hydroxides prior to heating the latter flow.

The method according to the invention may be carried out in batches or in a continuous process. It is preferred to carry out the method in a continuous process.

The invention furthermore relates to a device for recovering metals from a metal-containing flow, which device comprises a dissolving unit, a concentration unit, and an electrochemical unit.

The concentration unit preferably comprises a heat exchange plant and a settling unit. Said heat exchange plant is preferably provided for transferring heat from the solution of the metal salts and/or metal hydroxides, via a heat-containing flow, to another process flow that is to be heated, preferably the flow from the concentration unit, which contains a low concentration of metal salts and/or metal hydroxides, which flow is preferably led back to the dissolving unit. It is preferred to provide a settling unit for separating metals from the solution which has been cooled down in the heat exchange plant, whereby forming a small-volume flow containing a high concentration of metal salts and/or metal hydroxides and a large-volume flow containing a low concentration of metal salts and/or metal hydroxides are formed.

The heat exchange plant preferably comprises one or more evaporation units for evaporating the solvent or the solvents which are present in the solution, and one or more condensation units for condensing the vapour-phase solvent or solvents.

According to the invention, the evaporation unit preferably operates at low pressure, and the condensation unit preferably operates at high pressure. The combination of evaporation unit and condensation unit, or the combinations of various evaporation units and condensation units preferably operate via the socalled heat pump principle.

BRIEF DESCRIPTION OF THE DRAWINGS

FIG. 1 shows a diagrammatic embodiment of the device according to the invention.

FIG. 2 shows a preferred embodiment of the device according to the invention.

FIG. 3 is a diagrammatic, cross-sectional view of the electrochemical cell.

FIG. 4 is a diagrammatic, longitudinal sectional view of the electrochemical cell.

FIG. 1 shows a diagrammatic embodiment of the device according to the invention. The numerals in the figure refer to the following components:

1. a dissolving unit
2. a concentration unit
3. a heat exchange unit
4. a settling unit
5. an electrochemical unit
6. a heating unit
7. a metal-containing flow
8. a flow of solvent(s), which may contain (an) additive(s)
9. a solution containing metal salts and/or metal hydroxides
10. a vapour and gas flow
11. a heat-containing flow
12. a relatively cold, condensed flow
13. a large-volume flow containing a low concentration of metal salts and/or metal hydroxides
14. a small-volume flow containing a high concentration of metal salts and/or metal hydroxides
15. a flow containing a low concentration of metal salts and/or metal hydroxides
16. a flow of recovered metals
17. a flow containing a low concentration of metal salts and/or metal hydroxides, which is led back to the electrochemical unit
18. a flow containing a low concentration of metal salts and/or metal hydroxides, which is led back to the concentration unit The method and the device according to the invention are in particular suitable for recovering metals from electric and electronic products, for example printed circuit boards, from galvanised steel from electric appliances, from fly ash from incineration plants and metal melting plants, from sludge and filter cake from flue gas and waste water processing plants and from galvanised scrap.

According to one preferred embodiment, the combination of concentration unit, settling unit and heat exchange unit consists of a settling basin, which is on the upper side provided with an evaporation unit, which operates at low pressure, and with a vapour compressor. The heat of the solution of metal salts and/or metal hydroxides is transferred, via the evaporation unit operating at low pressure and the vapour compressor, wherein the solvent or solvents function as a heat-transferring medium or as heat transferring media, to the large-volume flow containing a low concentration of metal salts and/or metal hydroxides, which is led back to the dissolving unit via the overflow of the settling basin before the solution of metal salts and/or metal hydroxides is carried back to the settling basin. This preferred embodiment is diagrammatically shown in FIG. 2, wherein (21) is the settling basin, (22) is the evaporation unit operating at low pressure, (23) is the evaporation compressor, (24) is the solution of metal salts and/or metal hydroxides, (25) is the small-volume flow containing a high concentration of metal salts and/or metal hydroxides, (25) is the large-volume flow containing a low concentration of metal salts and/or metal hydroxides, (27) is the heat-containing flow and (28) is the relatively cold, condensed flow.

According to the invention, the electrochemical unit preferably comprises an electrochemical cell. A conventional electrochemical cell comprises an electrochemical vessel, which accommodates a series of electrodes, wherein said electrodes alternately function as anodes and cathodes. When metals are being recovered by means of electrochemical conversion, the metal or metals are deposited on the cathodes, and consequently the cathodes must be removed from the electrochemical vessel at regular intervals in order to remove the metal that has deposited on the cathodes. The electrochemical cell according to the invention, however, comprises electrodes, in particular cathodes, of such a type that they need not be removed any more for removing the metal that has deposited thereon. Consequently, the electrochemical cell according to the invention is preferably provided with an electrochemical vessel, which accommodates at least one electrode which is rotatable about a rotary shaft, preferably a rotatable cathode.

The cathode may have any shape that is suitable, of course, for example circular, oval or rectangular. According to the invention, the cathode is preferably substantially circular.

The cathode is provided with a scraping device, which removes metals that have deposited on the cathode by scraping off said metals. The scraping device comprises a scraping element and a conveyor, which extends outside the electrochemical vessel. The conveyor cooperates with the scraping element in such a manner that material which is scraped off the rotatable cathode is transported to a location outside the electrochemical cell, where it is subsequently discharged from the electrochemical vessel through an outlet opening.

The conveyor is preferably made of a chemically inert and wear-resistant material, it may be disposed in an electrically neutral manner or in an anodically or cathodically protected manner.

The conveyor preferably comprises one or more conveyor screws or worm wheels, which are oriented in radial direction with their central axis with respect to the rotary shaft of the cathode. A housing is present along the conveyor screw (s), which housing bounds a transport chamber together with the surface of the cathode which is being scraped. It will be apparent that if the ends of the housing are made of a hard material, for example stainless steel, said ends cannot come into direct contact with the cathode surface in such a manner that this would result in wear of the cathode. Consequently, the ends of the housing are preferably made of a flexible and/or relatively soft material, for example a brush or a comb made of an inert plastic material, so that the housing, together with the cathode surface, forms a transport chamber via said flexible and/or relatively soft ends, in such a manner that the scraped-off material is carried substantially outside, and preferably completely outside, the electrochemical cell. Furthermore it will be apparent that the housing must enclose the conveyor screw(s) completely outside the circumference of the cathode, since scraped-off material will otherwise land in the electrochemical cell again.

The scraping element and the conveyor screw may be disposed in an electrically insulated manner, if necessary, and be anodically or cathodically protected. The cutting edge of the scraping element is preferably made of a wear-resistant, chemically resistant material, and it can be adapted to the type of metal deposit that is to be scraped off.

The scraping element is preferably made up of the conveyor screw. The advantage of this is that the cathode surface is being scraped by the rotating movement of the conveyor screw, whilst the scraped-off material is at the same time carried to a location outside the electrochemical cell.

The side of the scraping element which comes into contact with the material deposited on the cathode, or with the cathode as such, may be sharp or be provided with teeth or the a like, in a manner which makes it easier to scrape off the deposited material.

According to one preferred embodiment of the invention, the above-described scraping element is present on either side of the cathode, so that scraping will take place on either side of the cathode. The clearance between the cutting edge of the scraping element and the cathode is adjustable.

The rotation of the cathode and the rotation of the scraping device are effected via independent drive units, which may be present outside the electrochemical cell, whereby the rotation of the cathode is according to the invention preferably effected via a drive unit which is present outside the electrochemical cell. Both the cathode and the scraping element can rotate continuously or intermittently at a rotational speed and a time interval which can adjusted as desired.

The scraping device can be disposed at varying angles to the cathode surface. According to the invention, the selection of the angle between the central axis of the scraping device and the perpendicular through the rotary shaft, at the location where the electrode is connected to the rotary shaft, is a design matter.

The supply of current to the cathode takes place by means of power supply means, for example sliding contacts such as carbon brushes, whereby said power supply means work outside the electrochemical cell, via the rotary shaft of the cathode.

One preferably of the electrochemical cell according to the invention will now be explained in more detail with reference to FIGS. 3 and 4.

FIGS. 3 is a diagrammatic, cross-sectional view, and FIG. 4 is a diagrammatic, longitudinal sectional view of the electrochemical cell.

The electrochemical cell is provided with an electrochemical vessel (1), which accommodates a cathode (2) and an anode (3). The cathode (2) rotates about a rotary shaft (4). The cathode (2) is provided with a device (5) which scrapes the cathode and which also transport the scraped-off material to a location outside the electrochemical cell. Device (5) preferably comprises two conveyor screws or worm wheels (6), which each act on one side of the cathode. A housing (7) surrounds the device (5), which housing, together with the cathode surface, forms a transport chamber, whereby the housing (7) entirely encloses the device (5) outside the circumference of the cathode. The electrochemical cell is furthermore provided with an outlet (8), through which the scraped-off material can be discharged.

The rotary shaft (4) of the cathode is driven via a variable drive unit. The rotary shaft (4) is furthermore provided with one or more power supply means (10), for example sliding contacts, such as carbon brushes.

Furthermore, one or more membranes (11) may be present in the electrochemical cell, which membranes separate the anode space and the cathode space from each other, which is for example necessary when selective transport of ions is desired. Suitable membranes are for example made of ceramic materials or plastic materials, for example perfluorosulphonate polymers, perfluorocarboxylate polymers or combinations of such polymers, whereby membranes of plastic material may be reinforced with materials such as polytetrafluoroethylene fabrics.

The electrochemical cell is preferably provided with a gastight cover (12) for the purpose of providing a controlled vapour discharge, protecting the environment and the working area and preventing loss of solvent(s), reaction products and heat. The cover may also be provided with one or more ventilating openings (13).

What is claimed is:

1. A method for recovering metals from a metal-containing flow, wherein:
   a. the metal-containing flow and a solvent are supplied to a dissolving unit, whereby a metal-containing solution containing metal salts and/or metal hydroxides is formed;

b. the metal-containing solution is then supplied to a concentration unit;

c. the metal-containing solution is separated in the concentration unit into a small-volume flow containing a high concentration of metal salts and/or metal hydroxides, and a large-volume flow containing a low concentration of metal salts and/or metal hydroxides;

d. the small-volume flow containing a high concentration of metal salts and/or metal hydroxides is supplied to an electrochemical unit, whereas the large-volume flow containing a low concentration of metal salts and/or metal hydroxides is communicated back to the dissolving unit; and e. the small-volume flow containing a high concentration of metal salts and/or metal hydroxides is separated in said electrochemical unit into a flow containing one or more metals, and a flow containing a low concentration of metal salts and/or metal hydroxides, said latter flow being communicated back to the electrochemical unit.

2. A method according to claim 1, wherein during step c said solution (9) is cooled down, whereby a heat-containing flow (11) and a cooled-down solution (12) are formed.

3. A method according to claim 2, wherein said heat-containing flow (11) substantially consists of the solvent or the solvents (8) from the solution (9).

4. A method according to claim 2, wherein said heat-containing flow (11) is led to a heat exchange unit (3).

5. A method according to claim 1, wherein during step (c) said solution is carried to a settling unit.

6. A method according to claim 1, wherein said large-volume flow (13) containing a low concentration of metal salts and/or metal hydroxides is heated (6).

7. A method according to any of the preceding claims 1–6, wherein said small-volume flow (14) containing a high concentration of metal salts and/or metal hydroxides is heated (6).

8. A method according to claim 1, wherein during step (e) part of said flow containing a low concentration of metal salts and/or metal hydroxides is communicated to the electrochemical unit.

9. A method according to claim 1, wherein during step (e) part of said flow containing a low concentration of metal salts and/or metal hydroxides is communicated to the concentration unit.

10. A metal according to claim 1, wherein the method is carried out in a continuous process.

11. A device for carrying out a method according to claim 1, the device comprising:

(a) a dissolving unit for mixing a metal-containing flow and a solvent so that a metal-containing solution containing metal salts and/or metal hydroxides is formed;

(b) a concentration unit connected with the dissolving unit, seen in the direction of the flow, for separating the metal-containing solution into a small-volume flow containing a high concentration of metal salts and/or metal hydroxides, and a large-volume flow containing a low concentration of metal salts and/or metal hydroxides;

(c) an electrochemical unit connected with the concentration unit, seen in the direction of the flow, for separating the small-volume flow containing a high concentration of metal salts and/or metal hydroxides into a flow containing one or more metals, and a flow containing a low concentration of metal salts and/or metal hydroxides, (d) said concentration unit being placed in-between the dissolving unit and the electro chemical unit, wherein said electro chemical unit is provided with a conduit for leading the flow containing a low concentration of metal salts and/or hydroxides to the concentration unit, and wherein said concentration unit has a conduit for leading the flow containing a low concentration of metal salts and/or hydroxides to the dissolving unit.

12. A device according to claim 11, wherein said concentration unit (2) comprises a heat exchange unit (3) and a settling unit (4).

13. A device according to claim 12, wherein said heat exchange unit (3) includes one or more evaporation units (22) and one or more condensation units.

14. A device according to claim 13, wherein said evaporation unit (22) operates at low pressure.

15. A device according to claim 13, wherein said condensation unit operates at high pressure.

16. A device according to claim 11, wherein said electrochemical unit comprises an electrochemical cell.

17. A device according to claim 16, wherein the electrochemical cell comprises an electrochemical vessel (1) wherein at least one electrode (2), which is rotatable about a rotary shaft (4), is accommodated in said electrochemical vessel (1), which electrode (2) is provided with a scraping device (5), which extends in radial direction with respect to said rotary shaft (4), which scraping device (5) comprises a scraping element and a conveyor (6) which cooperates therewith, which conveyor (6) extends outside the electrochemical vessel (1), wherein the conveyor (6) transports the material that has been scraped off the electrode (2) to a location outside the electrochemical vessel (1), and which comprises at least one conveyor screw, whose central axis extends in radial direction with respect to said rotary shaft (4), as well as a housing (7) extending along the conveyor screw, which housing bounds a transport chamber together with the surface of the electrode (2), and which encloses said conveyor screw outside the circumference of said electrode (2).

18. A device according to claim 17, wherein said conveyor (6) forms said scraping element.

19. A device according to claim 17, wherein said scraping device (5) is present on either side of the electrode (2).

20. A device according to claim 17, wherein the drive unit for providing rotation of the scraping element operates independently of the rotation of the electrode.

21. A device according to claim 17, wherein the angle between the central axis of said scraping device and the perpendicular through the rotary shaft, at the location where the electrode is connected to the rotary shaft, is adjustable.

22. A device according to claim 17, wherein the cell is provided with a gastight cover.

* * * * *